United States Patent [19]

Yamagishi et al.

[11] Patent Number: 5,408,334

[45] Date of Patent: Apr. 18, 1995

[54] METHOD AND APPARATUS FOR HAVING A PROCESSOR EXECUTE A JOB UTILIZING AN ELECTRONIC MAIL SYSTEM

[75] Inventors: Tadashi Yamagishi, Yokohama; Masahiko Ishimaru, Fujisawa; Fujio Fujita, Yokohama; Yoshikazu Ichikawa, Fujisawa; Hideki Namba, Hadano; Motohide Kokunishi, Kokubunji; Michio Hirano, Chigasaki; Kaoru Kozuma, Yokosuka; Toshio Hirosawa, Machida; Tutomu Itoh, Kanagawa; Atsushi Ueoka, Hachioji; Shigeru Sasaki, Kamakura; Kazuyuki Nakamura, Tokyo, all of Japan

[73] Assignees: Hitachi, Ltd.; Hitachi Software Engineering Co., Ltd.; Hitachi Electronics Services Co., Ltd., all of Tokyo, Japan

[21] Appl. No.: 155,794

[22] Filed: Nov. 23, 1993

[30] Foreign Application Priority Data

Nov. 24, 1992 [JP] Japan .................................. 4-313562

[51] Int. Cl.⁶ .......................................... H04M 11/00
[52] U.S. Cl. ........................................ 358/402; 379/88
[58] Field of Search .............................. 358/402–403; 379/88, 96

[56] References Cited

U.S. PATENT DOCUMENTS

| 4,790,003 | 12/1988 | Kepley et al. | 379/88 |
| 5,170,266 | 12/1992 | Marsh et al. | 358/468 |
| 5,170,428 | 12/1992 | Watanabe et al. | 358/402 |
| 5,224,156 | 6/1993 | Fuller et al. | 379/100 |
| 5,257,112 | 10/1993 | Okada | 358/402 |

FOREIGN PATENT DOCUMENTS

64-67672  3/1989  Japan .

Primary Examiner—Stephen Brinich
Attorney, Agent, or Firm—Antonelli, Terry, Stout & Kraus

[57] ABSTRACT

A job control terminal creates a unit configuration table indicating the configuration of units connected to each of a plurality of processors in a multi-processor system. The job control terminal also creates an operating state table indicating an operating state of each processor including a CPU using ratio, I/O using ratio, memory using ratio, response time, and so on. When the job control terminal receives electronic mail for requesting job execution from a user through an electronic mail terminal, the job control terminal selects a processor assigned to execute the requested job based on the unit configuration table and the operating state table. When it is determined from the states of the processors that the requested job cannot be executed, information indicating that the job is unacceptable is transmitted from the job control terminal to the electronic mail terminal.

14 Claims, 6 Drawing Sheets

| UNIT NAME | MT1 | MT2 | DISK 1 | DISK 2 | VECTOR PROCESSOR | |
|---|---|---|---|---|---|---|
| OPERATING STATE | 1 | 2 | 2 | 2 | 2 | |

1: INOPERABLE STATE
2: OPERABLE STATE

FIG. 3

| ITEM | CPU USING RATIO | I/O USING RATIO | MEMORY USING RATIO | RESPONSE TIME |
|---|---|---|---|---|
| STATE | 60 | 50 | 80 | 3.5 |

FIG. 4

| MAIL NAME | UNIT NAME | PROCESSOR SELECTION PRIORITY SPECIFIED BY MAIL | | | |
|---|---|---|---|---|---|
| | | CPU | I/O | MEMORY | RESPONSE TIME |
| MAIL 1 | MT1, DISK1, ··· | 1 | 2 | 3 | 4 |
| MAIL 2 | MT2, DISK2, ··· | 2 | 4 | 3 | 1 |
| MAIL 3 | DISK1, VECTOR PROCESSOR | 2 | 1 | 4 | 3 |
| MAIL n | | | | | |

FIG. 5

| PROCESSOR NAME / UNIT NAME | PROCESSOR 1 | PROCESSOR 2 | PROCESSOR 3 | |
|---|---|---|---|---|
| MT 1 | 1 | 2 | 0 | |
| MT 2 | 2 | 2 | 0 | |
| MT 3 | 0 | 1 | 1 | |
| DISK 1 | 2 | 2 | 2 | |
| DISK 2 | 2 | 2 | 1 | |
| CCP 1 | 0 | 1 | 2 | |
| VECTOR PROCESSOR | 2 | 0 | 0 | |
|  |  |  |  | |

0: CONNECTION DISABLED STATE
1: INOPERABLE STATE
2: OPERABLE STATE

FIG. 6

| PROCESSOR NAME / ITEM | PROCESSOR 1 | PROCESSOR 2 | PROCESSOR 3 | |
|---|---|---|---|---|
| CPU USING RATIO | 60 | 70 | 40 | |
| I/O USING RATIO | 50 | 80 | 90 | |
| MEMORY USING RATIO | 80 | 50 | 40 | |
| RESPONSE TIME | 3.5 | 5.0 | 3.5 | |

METHOD AND APPARATUS FOR HAVING A PROCESSOR EXECUTE A JOB UTILIZING AN ELECTRONIC MAIL SYSTEM

BACKGROUND OF THE INVENTION

The present invention relates to a method and apparatus with which a user has a processor execute a job by utilizing an electronic mail system, and more particularly to a processor selection system suitable for use in a system wherein a host computer is comprised of a plurality of processors.

A method by which a user has a processor execute a job by utilizing an electronic mail system has been known, for example, from a technique described in JP-A-64-67672.

In the technique described in JP-A-64-67672, a request for a business consignment and the contents of documents necessary for delivery of goods are sent from an electronic mail terminal to a host computer through a communication cable, and the electronic mail terminal receives the results of a predetermined job executed by the host computer.

The above-mentioned known art is designed such that a single processor directly receives a request for executing a job. Therefore, when a processor which has received a job execution request is instructed to transfer the job to another processor for executing the job, if the processor for receiving job execution requests is not operating, the user cannot send the job execution request even if other processors are in operation. Another problem possibly arising in the known art is that a load of the processor for receiving job execution requests is excessively increased.

Further, even when a host computer according to the above-mentioned technique is comprised of a plurality of processors, a user is required to select a processor to which a job is assigned and send electronic mail to this selected processor if a job cannot be transferred between the plurality of processors. Since loads of plural jobs cannot be distributed to the plurality of processors, a problem arises that processing of the jobs may be concentrated on a particular processor.

SUMMARY OF THE INVENTION

It is an object of the present invention to provide a method and apparatus for use in a system for having a processor execute a job by utilizing an electronic mail system, which are capable of receiving jobs irrespective of an operating state of a processor designated to receiving job execution requests.

It is another object of the present invention to provide a processor selection system which is capable of reducing overhead of the processor designated to receive job execution requests.

It is a further object of the present invention to provide a processor selection system which eliminates the necessity of selecting, from an electronic mail terminal, a processor to which job execution is assigned, when the electronic mail terminal is to send electronic mail, and achieves distribution of the mail load among a plurality of processors.

According to the present invention, the above-mentioned objects are achieved in a system including at least one processor for executing a job and an electronic mail system for sending electronic documents, by a job control terminal which receives a job execution request and transfers the received job to at least one processor for executing a job.

The above-mentioned objects are also achieved by providing processing means for informing a job control terminal, from each processor which can execute a job, of the configuration of units connected to its own processor; processing means for providing a job control terminal for accepting a job execution request with the configuration of units required by a job on the basis of a job execution requesting mail transmitted from an electronic mail terminal; selecting means for selecting a processor assigned to execute the job, based on the configuration of units required by the job indicated in the job execution requesting mail and the configurations of units connected to the respective processors when a command is sent to a processor to execute the job; and processing means for informing the electronic mail terminal whether or not the job execution requesting mail is acceptable from the configuration of units required by the job indicated in the job execution requesting mail and the configurations of units connected to the respective processors.

The above-mentioned objects are further achieved by providing processing means in each processor for checking the operating state of the associated processor and informing the job control terminal of the checked operating state; and selecting means in the job control terminal for checking operating states of processors when a command for executing a job is sent to the processors, and selecting a processor assigned to execute the job, based on the operating states of the processors.

The selecting means for selecting a processor assigned to execute a job from the operating states of processors in the processor group may include selecting means for selecting a job executing processor from a CPU using ratios of respective processors, selecting means for selecting a job executing processor from a I/O using ratios of the respective processors, selecting means for selecting a job executing processor from a memory using ratios of the respective processors, and selecting means for selecting a job executing processor from response times required by the respective processors for completing the job.

According to the preferred embodiment of the present invention, at least one processor for executing a job checks the configuration of units connected thereto and informs the job control terminal of the unit configuration. The job control terminal, upon receiving a job execution requesting mail from an electronic mail terminal, acquires a unit configuration required by a job indicated in the job execution requesting mail. The processor selecting means of the job control terminal automatically selects a processor which can execute the job based on the unit configuration required by the job indicated in the job execution requesting mail and the unit configurations of the processors in the system. With this processing, a user may only transmit a job execution requesting mail from the electronic mail terminal to the job control terminal. Thus, the user, when transmitting a job execution requesting mail, need not personally select a processor in consideration of the unit configuration, operating states and so on of the processors.

Also, the job control terminal can inform the electronic mail terminal whether or not a job execution requesting mail is acceptable from a unit configuration required by a job indicated in the job execution requesting mail and unit configurations of the processors included in the system. This allows the user to immediately receive a notice indicating that the job execution requesting mail is unacceptable, so that the user can proceed to next processing without wasting time.

Further, each of the processors in the system for executing a job checks an operating state thereof (e.g., a CPU using ratio, I/O using ratio, memory using ratio, and response time), and informs the job control terminal of a changed operating state every time the operating state is changed. The processor selecting means in the job control terminal, upon receiving a job execution requesting mail from the electronic mail terminal, automatically selects a processor assigned to execute a job, based on the operating states of the processors such that the operating states of the processors remain properly. With this processing, the user is provided with an appropriate processor for executing the job without personally selecting the processor.

In the above-mentioned manner, the present invention can achieve the distribution of loads among job executable processors in the processor group, thus realizing the effective utilization of the processors in the system.

DESCRIPTION OF THE PREFERRED EMBODIMENT

One embodiment of a processor selection system according to the present invention will hereinafter be described in detail with reference to the accompanying drawings.

Figure 1:
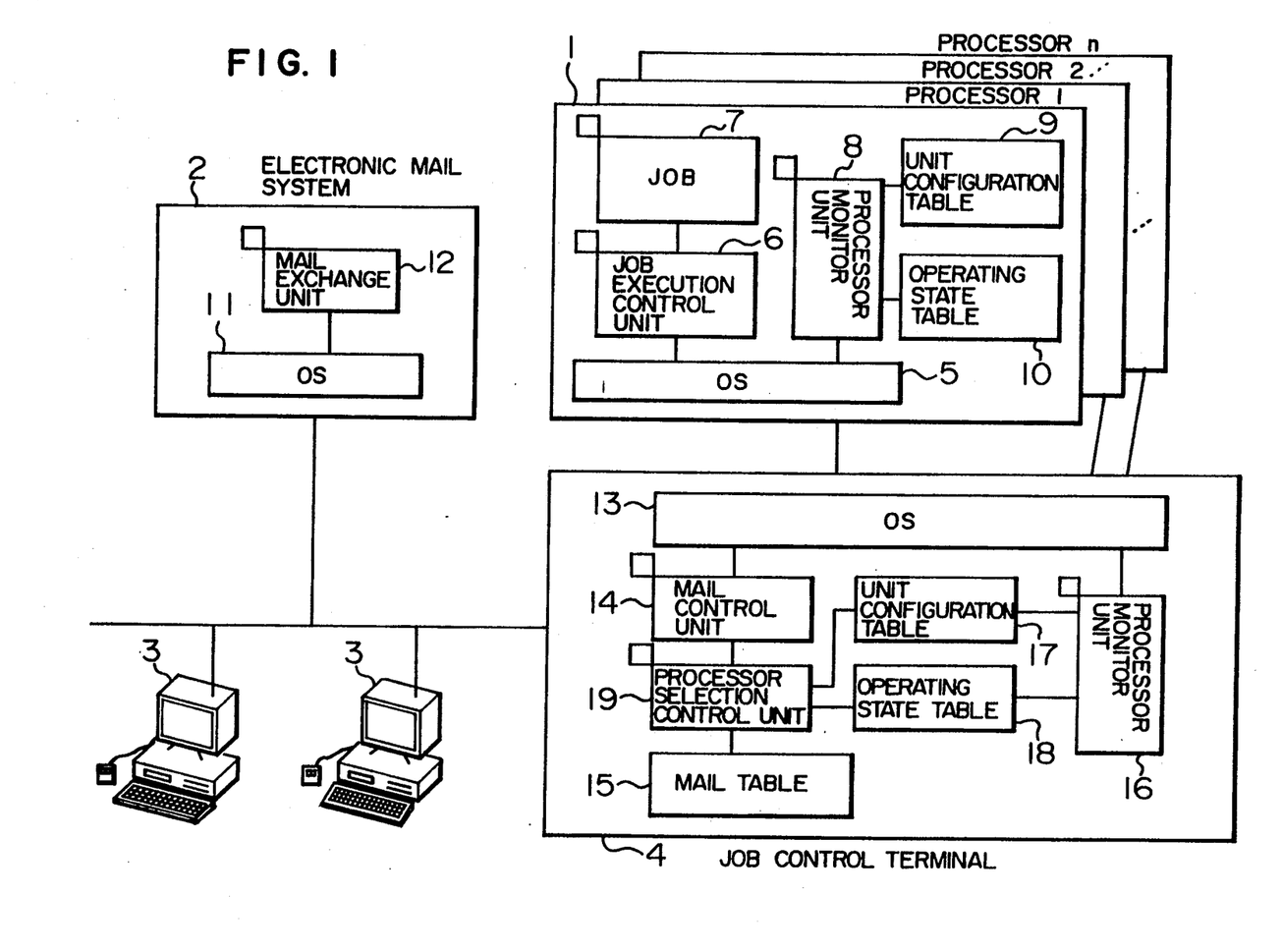
FIG. 1 is a block diagram showing the configuration of one embodiment of the present invention.

A system according to one embodiment of the present invention, as shown in FIG. 1, comprises a group of processors 1 including a plurality of processors 1-n for executing jobs; an electronic mail system 2 for controlling the delivery of electronic mail from users; a group of electronic mail terminals 3 for transmitting job execution requests from users as electronic mail to the electronic mail system 2; and a job control terminal 4 for selecting a processor which is assigned to execute a job and providing the job to the selected processor.

Each processor in the processor group 1 for executing jobs comprises an operating system (OS) 5 for controlling the operation of the processor; a job execution control unit 6 for receiving a command for executing a job from the job control terminal 4 and generating a job 7; a processor monitor unit 8 for monitoring the operation of the associated processor to inform the job control terminal 4 of a state of the associated processor; a unit configuration table 9 for storing a unit configuration of the associated processor acquired by the processor monitor unit 8; and an operating state table 10 for storing the operating state of the processor acquired by the processor monitor unit 8.

The electronic mail system 2 comprises an OS 11 for controlling the operation of the electronic mail system 2; and a mail exchange unit 12 for receiving and delivering mails from the electronic mail terminals 3.

The job control terminal 4 comprises an OS 13 for controlling the operation of the job control terminal 4; a mail control unit 14 for receiving from the electronic mail system 2 a job execution requesting mail sent from an electronic mail terminal in the electronic mail terminal group 3; a mail table 15 for storing a unit configuration required by a job indicated in the job execution requesting mail; a processor monitor unit 16 for acquiring operating states of the processors 1-n from the processor monitor units 8 in the processors 1-n connected to the job control terminal 4; a unit configuration table 17 for storing information acquired by the processor monitor unit 16; an operating state table 18; and a processor selection control unit 19 for selecting a processor for executing a job and outputting commands.

In the embodiment of the present invention configured as described above, when a user wants to request job processing by a processor in the processor group 1-n from one of the electronic mail terminals in the group 3, the electronic mail terminal transmits the job to be processed to the electronic mail system 2 as a job execution requesting mail. The mail exchange unit 12 in the electronic mail system 2 transmits the received job execution requesting mail to the job control terminal 4.

The job control terminal 4 receives this electronic mail at the mail control unit 14. Then, the processor selection control unit 19 selects a processor assigned to execute the job, based on the contents of the mail table 15, unit configuration table 17 and operating state table 18, and issues a command to the selected processor in the processor group 1-n to execute the job.

Next, description will be made on how to select a processor to process a job, but first, an example of a data structure necessary for selecting a processor will be explained with reference to FIGS. 2-6.

Figure 2:
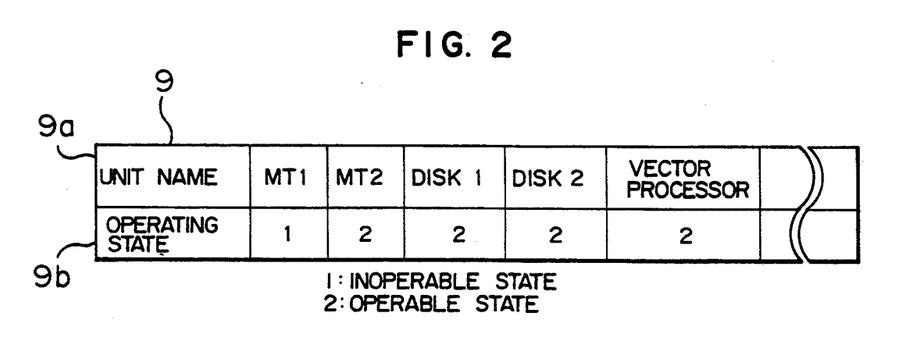
FIG. 2 is shows an example of the structure of a unit configuration table in each processor.

The table shown in FIG. 2 illustrates an example of a data structure in the unit configuration table 9 created in each processor in the processor group 1. Specifically, FIG. 2 shows an example of the unit configuration of the processor 1.

The unit configuration table 9 is formed by a unit name 9a for the processor to identify usable units and an operating state 9b of each of the units. The values in the operating state 9b indicate whether or not the units are operable. Specifically, the operating state 9b set to "1" indicates that the unit is in an inoperable state while "2" indicates that the unit is in an operable state.

Figure 3:
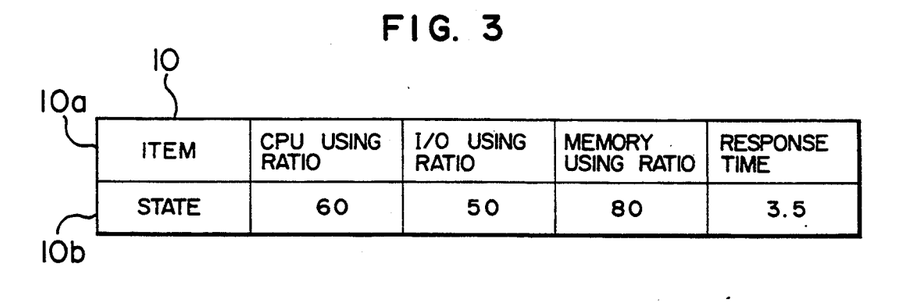
FIG. 3 shows an example of the structure of an operating state table in each processor.

The table shown in FIG. 3 illustrates an example of a data structure of the operating state table 10 created in each processor in the processor group 1. Specifically, FIG. 3 shows an example of an operating state of the processor 1.

The operating state table 10 is formed by a column 10a including a CPU using ratio, an I/O using ratio, a memory using ratio and response time of the associated processor; and a column 10b for indicating states of the respective items in the column 10a. The values in the column 10b indicating the operating state of the processor represent using ratios per unit time in percentage for the CPU using ratio, I/O using ratio and memory using ratio, while the value in the response time column indicates the ratio of a current response time to a response time when the associated processor alone is used to execute a model job (in other words, the value indicates how many times the current response time corresponds to the response time when the model job is executed by the processor alone).

Figure 4:
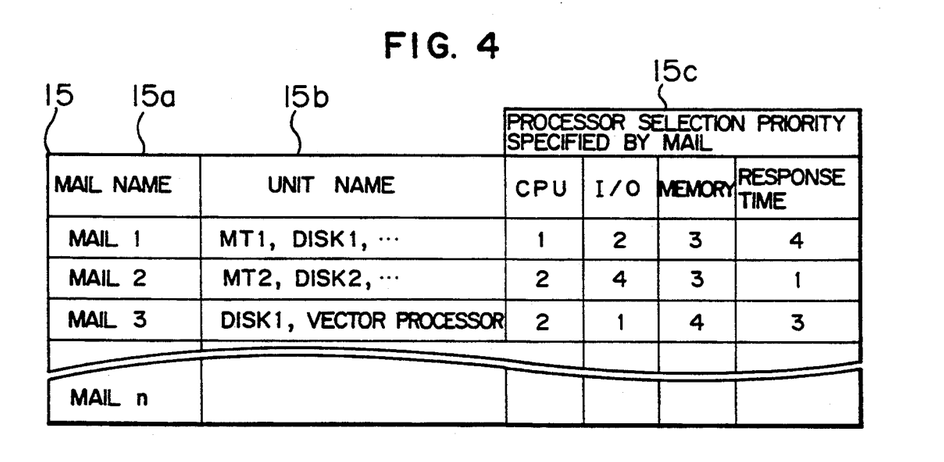
FIG. 4 shows an example of the structure of a mail table in a job control terminal.

The table shown in FIG. 4 illustrates an example of a data structure of the mail table 15 created in the job control terminal 4.

The mail table 15 is formed by a mail name 15a for identifying each job execution requesting mail; a unit name 15b showing units required by a job indicated in each job execution requesting mail; and a selection basis 15c for selecting a processor to be assigned to execute a job. Numbers "1"–"4" stored in the selection basis 15c indicate the order of basis items to be used for deciding the selection.

Figure 5:
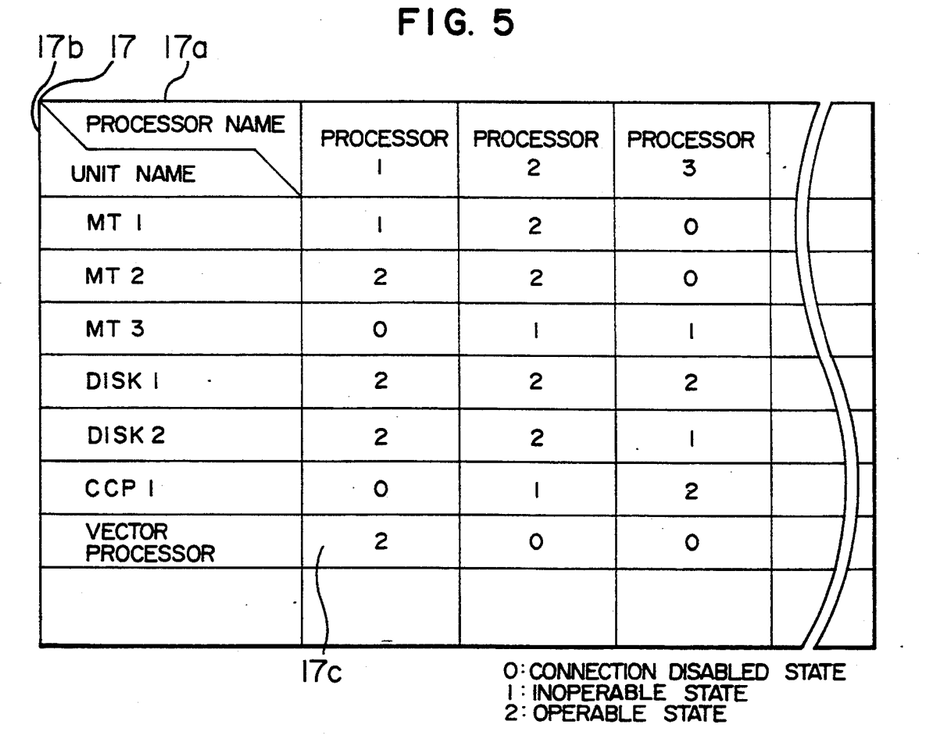
FIG. 5 shows an example of the structure of a unit configuration table in the job control terminal.

The table shown in FIG. 5 illustrates an example of a data structure of the unit configuration table 17 created in the job control terminal 4.

The unit configuration table 17 is formed by a processor name 17a for identifying each processor in the processor group 1-n to which job execution can be requested; a unit name 17b for identifying units which can be used by each processor; and an operating state 17c of each of these units. The operating state 17c indicates the state of each unit by values "0"–"2", wherein "0" indicates that an associated unit cannot be connected to an associated processor; "1" indicates that the associated unit is in an inoperable state; and "2" indicates that the associated unit is connected to the associated processor and is in an operable state.

Figure 6:
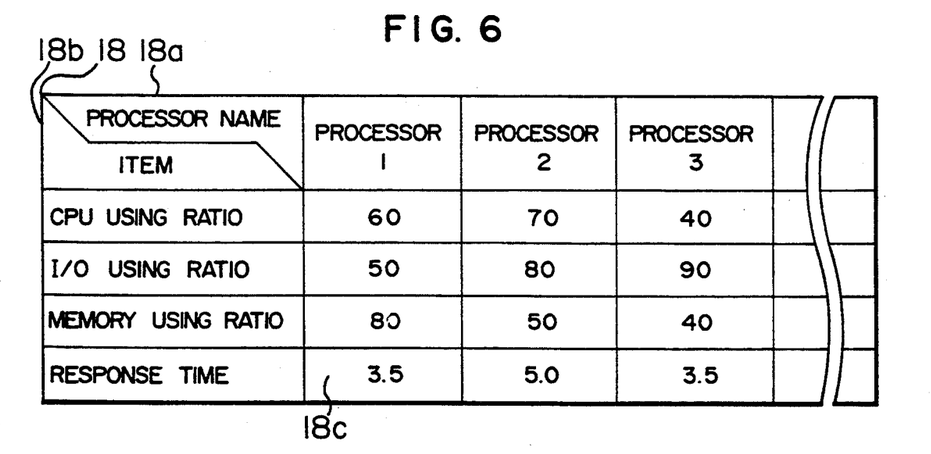
FIG. 6 is shows an example of the structure of an operating state table in the job control terminal.

The table shown in FIG. 6 illustrates an example of a data structure of the operating state table 18 created in the job control terminal 4.

The operating state table 18 is formed by a processor name 18a for identifying a processor in the processor group 1-n to which job execution can be requested; columns 18b including, respectively, the CPU using ratio, I/O using ratio, memory using ratio and response time of each processor; and states 18c of the respective items in the columns 18b. The states 18c of the respective items represent using ratios per unit time in percentage with respect to the CPU using ratio, I/O using ratio and memory using ratio, while the response time indicates the ratio of a current response time to a response time when the associated processor alone is used to execute a model job.

Figure 7:
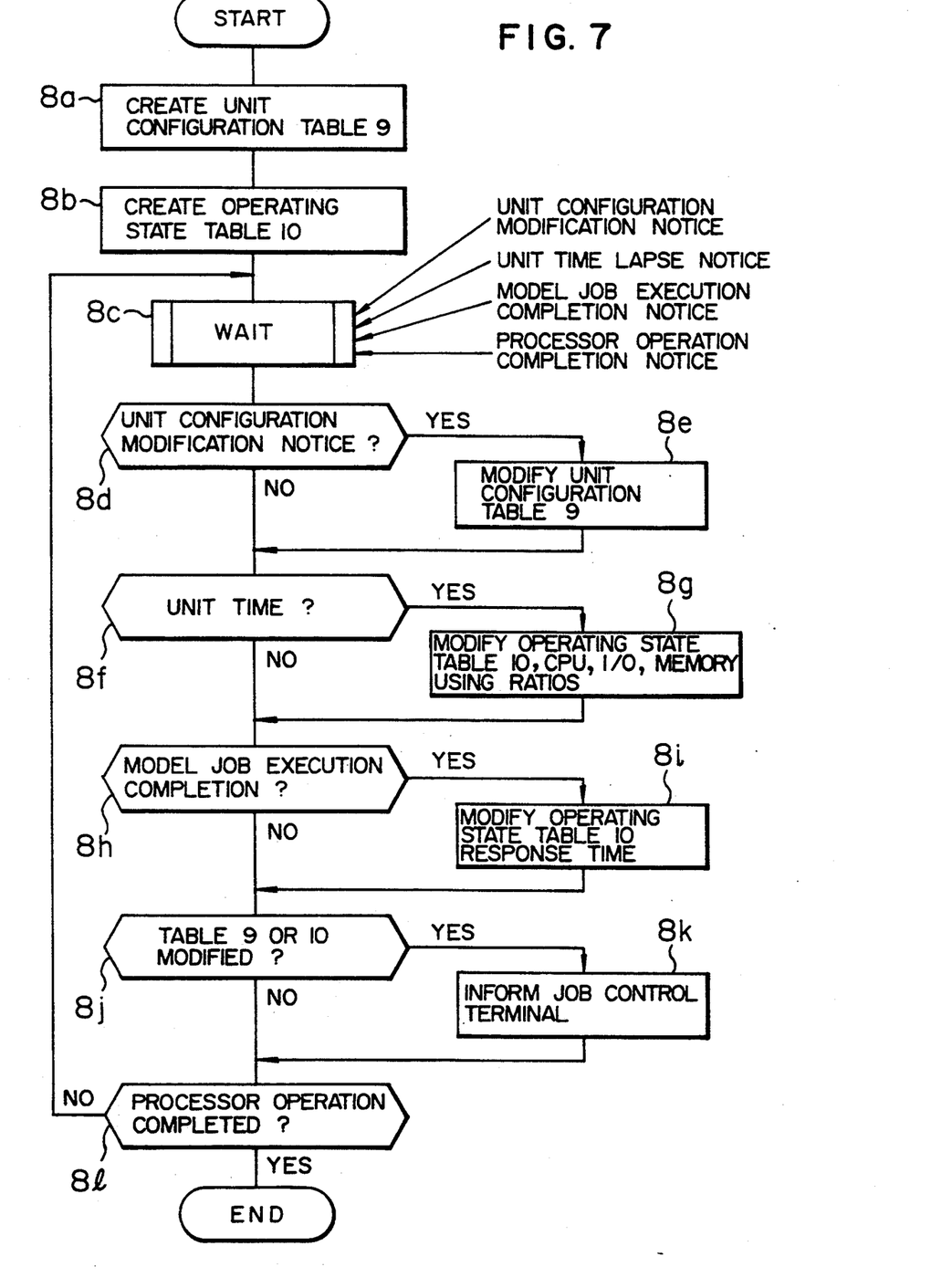
FIG. 7 is a flow chart used for explaining the operation of a processor monitor unit provided in each processor.

Next, the operation of the processor monitor unit 8 provided in each processor in the processor group 1 will be explained with reference to the flow chart shown in FIG. 7. This operation creates and/or updates the tables 9, 10 in each processor as well as informs the job control terminal 4 of the creation and/or modifications of tables if made.

(1) The processor monitoring unit 8, upon initiating a processor, checks paths connected to the processor from a variety of units to create the unit configuration table 9 and the operating state table 10. When the operating state table 10 is created, "0" is set to the states 10b for the using ratios as an initial value, while an initial value "1" is set for the response time (steps 8a, 8b).

(2) Thereafter, the processor monitor unit 8 waits for a notice from the OS 5. The notice from the OS 5, e.g., a unit configuration modification notice, a unit time lapse notice, a model job execution completion notice, a processor operation completion notice, and so on, may be transmitted while the processor monitor unit 8 is waiting (step 8c).

(3) The processor monitor unit 8, when receiving a unit configuration modification command, modifies the unit configuration table 9 (steps 8d, 8e).

(4) The processor monitor unit 8, when receiving a unit time lapse notice, acquires the using ratios of the CPU, I/O and memory from the OS 5 and modifies the using ratios of the respective units in the operating state table 10 (step 8f, 8g).

(5) The processor monitor unit 8, when receiving a model job execution completion notice for acquiring a response time, modifies a state of the response time in the operating state table 10. It should be noted that the model job is executed in each processor at predetermined time intervals for measuring the response time (step 8h, 8i).

(6) By the foregoing processing, the processor monitor unit 8 checks whether the unit configuration table 9 and the operating state table 10 have been newly created or modified. When either of these tables has been created or modified, the processor monitor unit 8 informs the job control terminal 4 of information on the creation or modification of the table (steps 8j, 8k).

(7) The processor monitor unit 8, when receiving a processor operation completion notice, terminates the operation. However, when the processor continues the operation, the processor monitor unit 8 returns to step 8c to repetitively execute the foregoing processing (step 8l).

By the foregoing processing, the processor monitor unit 8 can always ensure the latest status of the contents of the unit configuration table 9 and the operating state table 10 indicative of the state of the processor in which the processor monitor unit 8 is arranged.

Figure 8:
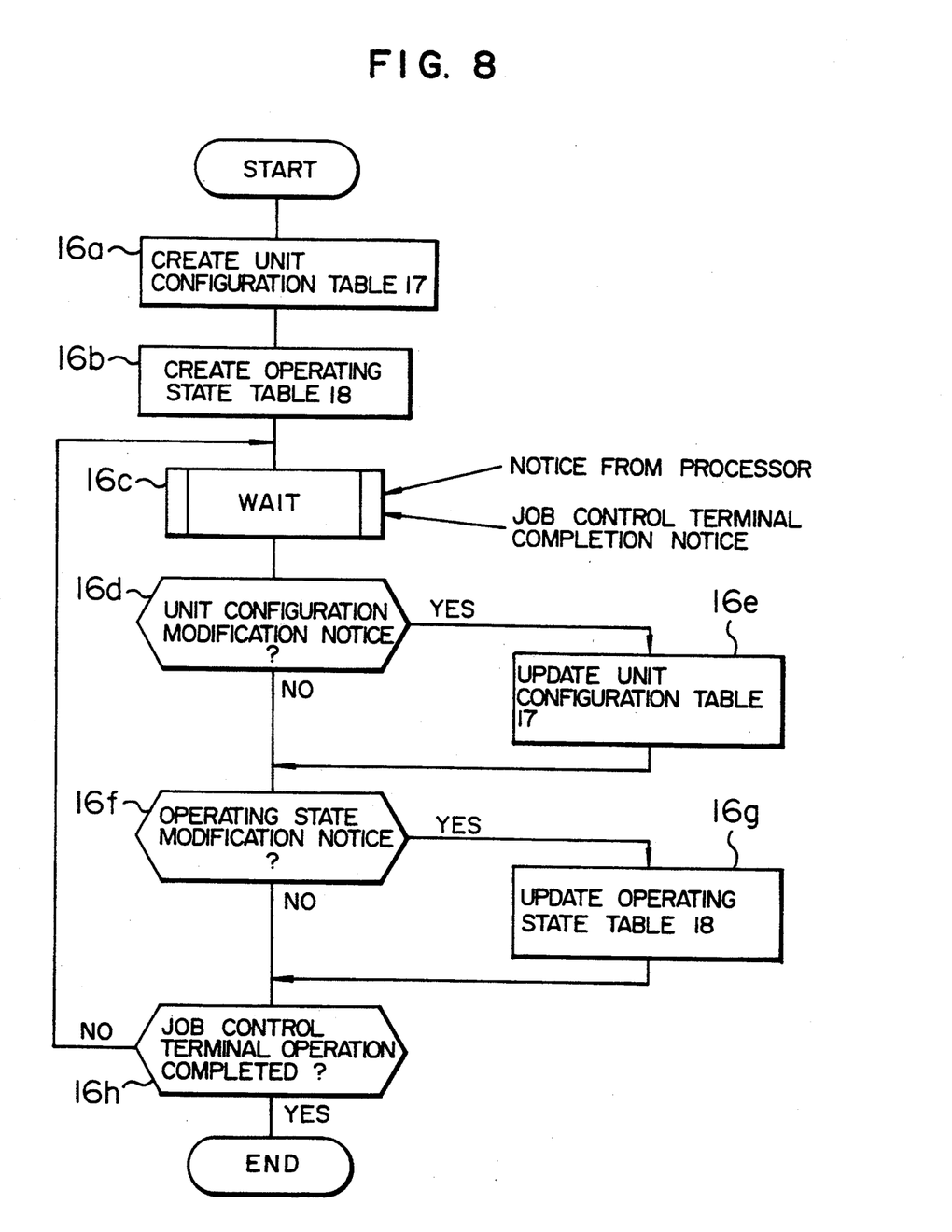
FIG. 8 is a flow chart used for explaining the operation of a processor monitor unit in the job control terminal.

Next, the operation of the processor monitor unit 16 in the job control terminal 4 will be explained with reference to the flow chart shown in FIG. 8. This operation causes the tables 17 and 18 in the job control terminal 4 (including a processor, not shown) to be created and/or modified.

(1) The processor monitor unit 16, upon initiating the job control terminal 4, creates the unit configuration table 17 and the operating state table 18, where only frames for the tables are set in this case (steps 16a, 16b).

(2) Thereafter, the processor monitor unit 16 waits for a notice from the OS 13. From the OS 13, a notice from the processor monitor unit 8 of each processor in the processor group 1, a job control terminal completion notice, and so on, may be delivered to the processor monitor unit 16 while it is waiting (step 16c).

(3) When a unit configuration table creation/modification notice is delivered from the OS 13, the processor monitor unit 16 updates the unit configuration table 17 (steps 16d, 16e).

(4) When an operating state table creation/modification notice is delivered from the OS 13, the processor monitor unit 16 updates the operating state table 18 (steps 16f, 16g).

(5) The processor monitor unit 16, when receiving an operation completion notice of the job control terminal 4, terminates the operation. However, when the job control terminal 4 continues the operation, the processor control unit 16 returns to step 16c to repetitively execute the foregoing processing (step 16h).

By the foregoing processing, the processor monitor unit 16 can always ensure the latest states in the contents of the unit configuration table 17 and the operating state table 18 in the job control terminal 4.

Figure 9:
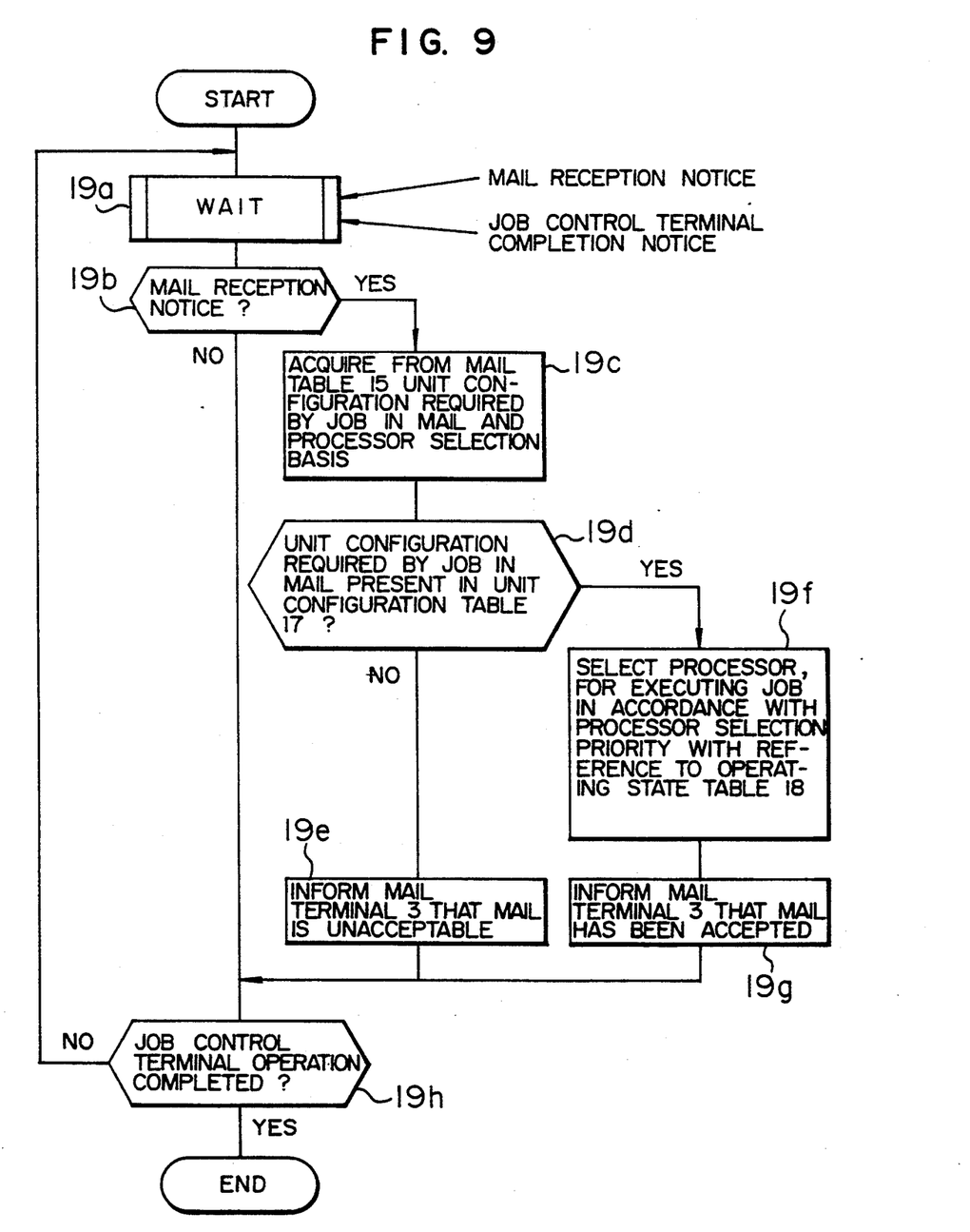
FIG. 9 is a flow chart used for explaining the operation of a processor selection control unit in the job control terminal.

Next, the operation of the processor selection control unit 19 in the job control terminal 4 will be explained with reference to a flow chart shown in FIG. 9. This processing allows an optimal processor to be selected for executing a job which has been requested from one of the electronic mail terminals in the group 3.

(1) The processor selection control unit 19 waits for a notice from the mail control unit 14. The mail control unit 14 may deliver a mail reception notice, a job control terminal completion notice, and so on, while the processor selection control unit 19 is waiting (step 19a).

(2) The processor selection control unit 19, when receiving a job execution requesting mail reception notice from the mail control unit 14, acquires a unit configuration necessary to execute a job and a processor selection basis from the mail table 15 in accordance with the mail name in the job execution requesting mail. It should be noted that the mail table 15 is created when the format of the job execution requesting mail is registered, and is corresponded by the mail name to units necessary to process a job which is requested by the mail, as described above (steps 19b, 19c).

(3) The processor selection control unit 19, based on information acquired from the mail table 15, determines from the unit configuration table 17 whether or not a processor exists which has the unit configuration necessary to execute the job. If no such processor exists, the processor selection control unit 19 notices the electronic mail terminal 3 that the job execution requesting mail is not acceptable (steps 19d, 19e). Since the user can immediately receive the unacceptable job notice from the electronic mail terminal 3, subsequent measures can be immediately taken for the case where a job is not acceptable. In this manner, an effect of the job control terminal according to the present invention is produced even when the host computer includes only one processor for executing a job.

(4) If the results of the determination at step 19d show that processors having the unit configuration necessary to execute the job have been registered in the unit configuration table 17, the processor selection control unit 19 selects a processor in accordance with the priority order of states used to select a processor with reference to the operating state table 18, and sends notice to the requesting electronic mail terminal 3 that the job execution requesting mail has been accepted. The selection of a processor is performed on the basis of the processor selection priority specified by the mail which is acquired from the mail table 15 in the following manner. For example, if a first unit having the processor selection priority "1" specified by the mail is a CPU, the processor with the least CPU using ratio is selected from the operating state table 18. If there are a plurality of CPU's with substantially the same CPU using ratio within a certain range (actually, a difference of several percent in the CPU using ratio does not constitute a significant factor for selecting a processor), the processor with the least using ratio is selected from second units having the processor selection priority set to "2" (steps 19f, 19g).

(5) The processor selection control unit 19, when receiving an operation completion notice of the job control terminal 4, terminates the operation. However, when the job control terminal 4 continues the operation, the processor control unit 16 returns to step 19a to repetitively execute the foregoing processing (step 16h).

The present embodiment performs the foregoing processing so as to allow a mail requester (user) to transmit a job execution requesting mail without taking into account the configurations and operating states of processors for executing a job as well as to allow the job control terminal to automatically select a processor assigned to execute a job such that the operating states of the respective processor remain proper.

According to the present invention as described above, since a processor available to execute a job can be automatically selected from a plurality of processors in accordance with a unit configuration necessary to execute the job, the mail requester can transmit a job execution requesting mail from an electronic mail terminal without specifying a particular processor for executing the job from the electronic mail terminal, thus improving the operability of the electronic mail terminal.

Also, according to the present invention, since a processor for executing a job can be automatically selected in accordance with operating states of processors such that the operating states of the respective processors remain proper, the user is provided with an appropriate processor assigned to execute a job. Further, an effective utilization of the processors can be achieved.

Further, according to the present invention, since each processor executes a job in response to a command from the job control terminal, an electronic mail control scheme is not required in each processor.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires operating state information on an operating state of said each processor from each of said plurality of processors, and checks the state of each of said plurality of processors based on said operating state information, and wherein said job control terminal acquires second unit configuration information on a unit configuration required by said requested job from the contents of said received electronic mail, and selects a processor assigned to execute said requested job from said states and said second unit configuration information.

2. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires operating state information on an operating state of said each processor from each of said plurality of processors, and checks the state of each of said plurality of processors based on said operating state information, and wherein said operating state information includes information on a CPU using ratio of an associated processor.

3. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires operating state information on an operating state of said each processor from each of said plurality of processors, and checks the state of each of said plurality of processors based on said operating state information, and wherein said operating state information includes information on an I/O using ratio of an associated processor.

4. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires operating state information on an operating state of said each processor from each of said plurality of processors, and checks the state of each of said plurality of processors based on said operating state information, and wherein said operating state information includes information on a memory using ratio of an associated processor.

5. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires operating state information on an operating state of said each processor from each of said plurality of processors, and checks the state of each of said plurality of processors based on said operating state information, and wherein said operating state information includes information on a response time of an associated processor.

6. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires first unit configuration information on the configuration of units connected to said each processor from each of said plurality of processors, and checks the state of each of said plurality of processors based on said first unit configuration information, wherein said job control terminal acquires operating state information on an operating state of said each processor from each of said plurality of processors, and checks the state of each of said plurality of processors based on said first unit configuration information and said operating state information, and wherein said operating state information includes information on a CPU using ratio of an associated processor.

7. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires first unit configuration information on the configuration of units connected to said each processor from each of said plurality of processors, and checks the state of each of said plurality of processors based on said first unit configuration information, wherein said job control terminal acquires operating state information on an operating state of said each processor from each of said plurality of processors, and checks the state of each of said plurality of processors based on said first unit configuration information and said operating state information, and wherein said operating state information includes information on an I/O using ratio of an associated processor.

8. In a system having a plurality of processors, an electronic mail terminal for transmitting electronic mail for requesting a job to be executed by one of said plurality of processors, and an electronic mail system for delivering electronic mail, a job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires first unit configuration information on the configuration of units connected to said each processor from each of said plurality of processors, and checks the state of each of said plurality of processors based on said first unit configuration information, wherein said job control terminal acquires operating state information on an operating state of said each processor from each of said plurality of processors, and checks the state of each of said plurality of processors based on said first unit configuration information and said operating state information, and wherein said operating state information includes information on a memory using ratio of an associated processor.

9. In a system having a plurality of processors, an electronic mail terminal for transmitting electronic mail for requesting a job to be executed by one of said plurality of processors, and an electronic mail system for delivering electronic mail, job executing method executed by a job control terminal connected to said plurality of processors and said electronic mail system, said method comprising the steps of:

receiving job execution requesting mail from said electronic mail terminal through said electronic mail system;

checking a state of each of said plurality of processors;

selecting a processor assigned to execute said requested job based on said states; and commanding said selected processor to execute said requested job;

wherein said job control terminal acquires first unit configuration information on the configuration of units connected to said each processor from each of said plurality of processors, and checks the state of each of said plurality of processors based on said first unit configuration information, wherein said job control terminal acquires operating state information on an operating state of said each processor from each of said plurality of processors, and checks the state of each of said plurality of processors based on said first unit configuration information and said operating state information, and wherein said operating state information includes information on a response time of an associated processor.

10. An apparatus for commanding a system to execute a job, said system having a plurality of processors, an electronic mail terminal for transmitting electronic mail for requesting a job to be executed by one of said plurality of processors, and an electronic mail system for delivering electronic mail, said job execution commanding apparatus comprising a job control terminal connected to said plurality of processors, said job control terminal including:

means for receiving job execution requesting mail from said electronic mail terminal through said electronic mail system;

means for monitoring a state of each of said plurality of processors;

means for storing said states;

means for selecting a processor assigned to execute said requested job based on said stored states; and means for commanding said selecting processor in said system to execute said requested job;

wherein said monitoring means acquires, from each of said plurality of processors, operating state information on an operating state of each processor and stores said operating state information into a second table in said storing means, and said job control terminal recognizes the state of each of said plurality of processors based on the contents of said second table, and wherein said job control terminal acquires from the contents of said received electronic mail second unit configuration information on the configuration of units required by said requested job, and selects a processor assigned to execute said requested job based on said states and said second unit configuration information.

11. An apparatus for commanding a system to execute a job, said system having a plurality of processors, an electronic mail terminal for transmitting electronic mail for requesting a job to be executed by one of said plurality of processors, and an electronic mail system for delivering electronic mail, said job execution commanding apparatus comprising a job control terminal connected to said plurality of processors, said job control terminal including:
- means for receiving job execution requesting mail from said electronic mail terminal through said electronic mail system;
- means for monitoring a state of each of said plurality of processors;
- means for storing said states;
- means for selecting a processor assigned to execute said requested job based on said stored states; and
- means for commanding said selecting processor in said system to execute said requested job;
- wherein said monitoring means acquires, from each of said plurality of processors, operating state information on an operating state of each processor and stores said operating state information into a second table in said storing means, and said job control terminal recognizes the state of each of said plurality of processors based on the contents of said second table,
- wherein said operating state information includes information on a CPU using ratio of an associated processor.

12. An apparatus for commanding a system to execute a job, said system having a plurality of processors, an electronic mail terminal for transmitting electronic mail for requesting a job to be executed by one of said plurality of processors, and an electronic mail system for delivering electronic mail, said job execution commanding apparatus comprising a job control terminal connected to said plurality of processors, said job control terminal including:
- means for receiving job execution requesting mail from said electronic mail terminal through said electronic mail system;
- means for monitoring a state of each of said plurality of processors;
- means for storing said states;
- means for selecting a processor assigned to execute said requested job based on said stored states; and
- means for commanding said selecting processor in said system to execute said requested job;
- wherein said monitoring means acquires, from each of said plurality of processors, operating state information on an operating state of each processor and stores said operating state information into a second table in said storing means, and said job control terminal recognizes the state of each of said plurality of processors based on the contents of said second table,
- wherein said operating state information includes information on an I/O using ratio of an associated processor.

13. An apparatus for commanding a system to execute a job, said system having a plurality of processors, an electronic mail terminal for transmitting electronic mail for requesting a job to be executed by one of said plurality of processors, and an electronic mail system for delivering electronic mail, said job execution commanding apparatus comprising a job control terminal connected to said plurality of processors, said job control terminal including:
- means for receiving job execution requesting mail from said electronic mail terminal through said electronic mail system;
- means for monitoring a state of each of said plurality of processors;
- means for storing said states;
- means for selecting a processor assigned to execute said requested job based on said stored states; and
- means for commanding said selecting processor in said system to execute said requested job;
- wherein said monitoring means acquires, from each of said plurality of processors, operating state information on an operating state of each processor and stores said operating state information into a second table in said storing means, and said job control terminal recognizes the state of each of said plurality of processors based on the contents of said second table,
- wherein said operating state information includes information on a memory using ratio of an associated processor.

14. An apparatus for commanding a system to execute a job, said system having a plurality of processors, an electronic mail terminal for transmitting electronic mail for requesting a job to be executed by one of said plurality of processors, and an electronic mail system for delivering electronic mail, said job execution commanding apparatus comprising a job control terminal connected to said plurality of processors, said job control terminal including:
- means for receiving job execution requesting mail from said electronic mail terminal through said electronic mail system;
- means for monitoring a state of each of said plurality of processors;
- means for storing said states;
- means for selecting a processor assigned to execute said requested job based on said stored states; and
- means for commanding said selecting processor in said system to execute said requested job;
- wherein said monitoring means acquires, from each of said plurality of processors, operating state information on an operating state of each processor and stores said operating state information into a second table in said storing means, and said job control terminal recognizes the state of each of said plurality of processors based on the contents of said second table,
- wherein said operating state information includes information on a response time of an associated processor.

* * * * *